(No Model.)

R. FALLIS.
CAR BRAKE.

No. 488,965. Patented Dec. 27, 1892.

Witnesses
N. Edw. Maybee
W. G. McMillan

Inventor
Richard Fallis
by Donald C. Ridout & Co.
Attys

UNITED STATES PATENT OFFICE.

RICHARD FALLIS, OF PONTYPOOL, ASSIGNOR OF ONE-HALF TO ROSSWELL H. STAPLES, OF BETHELAMY, CANADA.

CAR-BRAKE.

SPECIFICATION forming part of Letters Patent No. 488,965, dated December 27, 1892.

Application filed March 31, 1892. Serial No. 427,244. (No model.)

*To all whom it may concern:*

Be it known that I, RICHARD FALLIS, of the village of Pontypool, in the county of Durham, in the Province of Ontario, Canada, have invented a certain new and Improved Brake-Gear for Railroad-Cars, of which the following is a specification.

The object of the invention is to design a brake gear by which the brakes of a car may be instantaneously applied with the least possible effort, and it consists, essentially, of a rod for each brake beam, the said rods being connected together by means of a lever provided with a chain extending around sheaves arranged below the car, the said chain being connected to a sheaf suitably journaled on the back of the car and provided with a long lever extending above the car and arranged to work in conjunction with notches formed in the bracket attached to the top of the car in proximity to a foot plate provided with steps by which the brakeman can brace himself while operating the lever; substantially as hereinafter more particularly explained.

Figure 1:
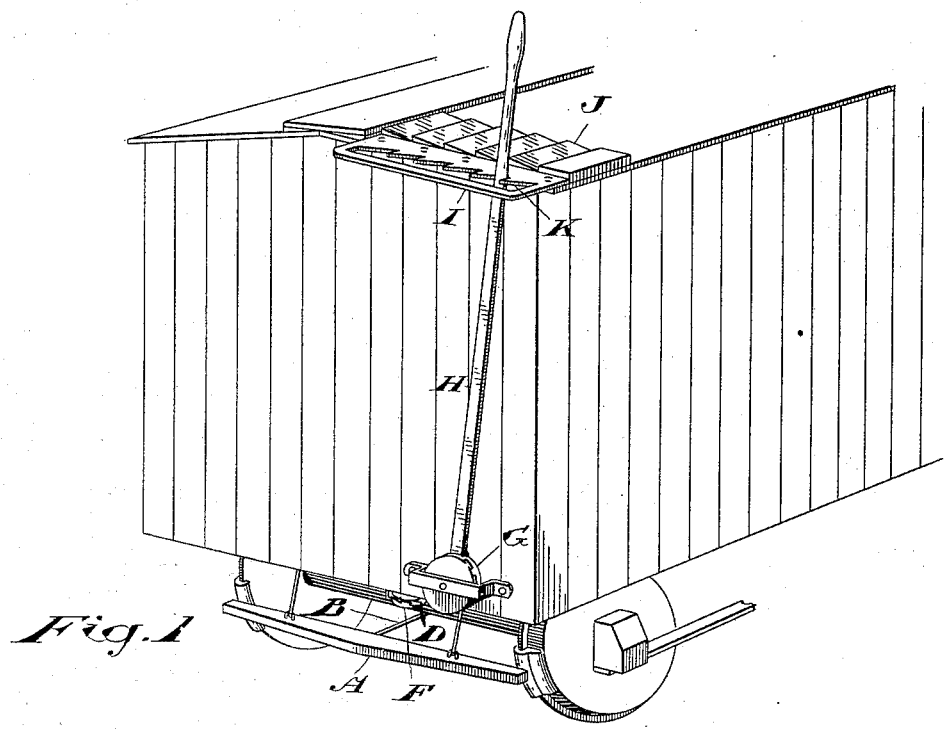
Figure 2:
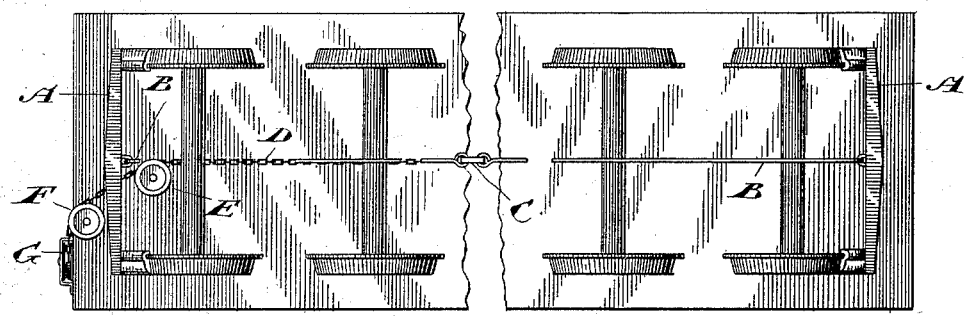
Figure 3:
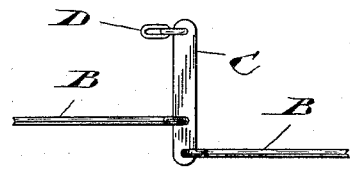

Figure 1, is an end view of a car provided with my improved brake-gear. Fig. 2, is a bottom plan of the car. Fig. 3, is a detail showing the lever by which the two back rods are connected.

In the drawings I show two brakes applied, one to each double pair of wheels, such as an ordinary truck is commonly supplied with, but of course it could easily be arranged so that each pair of wheels had a pair of brakes.

A, represents the brake beams. Each beam has a rod B, and the two rods shown are connected together by the lever C. On the end of the lever C, a brake chain D, is connected, which chain extends around the sheaf E, suitably journaled in the center of the car. After passing around the sheaf E, the chain extends around the sheaf E, and is attached to the sheaf G, suitably journaled on the end of the car, as indicated. This sheaf is provided with a lever H, extending to the top of the car as shown and passing through an elongated opening made in the bracket I, which bracket is firmly connected to the top of the car, as indicated.

Next to the bracket I, I firmly fix on top of the car a plate J, which is stepped, as indicated, so that the brakeman in grasping the lever H, is enabled to brace his feet against the steps in order to more readily apply the brakes by pulling upon the lever toward the center of the car.

On the brakes I, I form a series of teeth K, so that the pressure on the brakes may be graduated by dropping the lever H, into any one of the teeth K, desired.

From this description, it will be seen that the brakes by my arrangement may be very quickly and easily applied, as it is merely necessary to draw upon the lever H, in order to apply the brakes, and as the lever is long and the operation of the sheaves very effective, the brakeman can produce the desired effect with, comparatively speaking, little exertion, and owing to the stepped plate J, there is no danger of the brakeman stepping off the car while applying the brake.

What I claim as my invention is:—

1. The combination of a rod attached to each brake beam, the said rods being connected together by means of a lever provided with a chain extending around sheaves arranged below the car, the said chain being connected to a sheaf suitably journaled on the back of the car and provided with a long lever extending above the car and arranged to work in conjunction with notches formed in a bracket attached to the top of the car; substantially as and for the purpose specified.

2. The combination of a rod attached to each brake beam, the said rods being connected together by means of a lever provided with a chain extending around sheaves arranged below the car, the said chain being connected to a sheaf suitably journaled on the back of the car and provided with a long lever extending above the car and arranged to work in conjunction with notches formed in a bracket attached to the top of the car in proximity to a foot plate provided with steps by which the brakeman can brace himself while operating the lever; substantially as and for the purpose specified.

Bethany, February 27, 1892.

RICHARD FALLIS.

In presence of—
  J. W. PRESTON,
  ALFRED RYLEY.